May 24, 1966  H. S. BREMBECK  3,252,562
FEED DISTRIBUTING APPARATUS
Filed Oct. 7, 1963
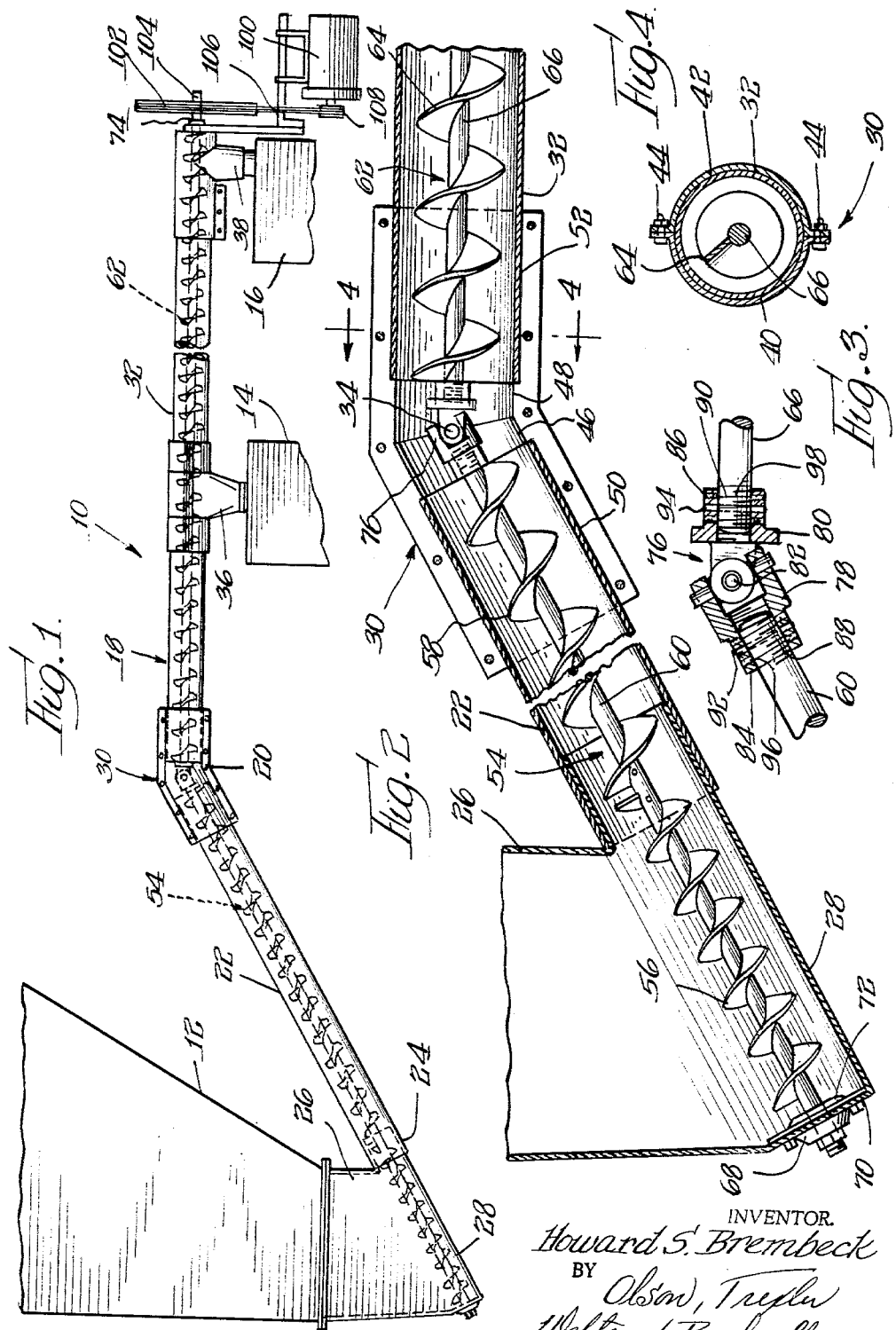
INVENTOR.
Howard S. Brembeck
BY
Olson, Trexler
Wolters & Bushnell attys.

United States Patent Office 3,252,562
Patented May 24, 1966

3,252,562
FEED DISTRIBUTING APPARATUS
Howard S. Brembeck, Goshen, Ind., assignor to Brock Manufacturing, Inc., Milford, Ind., a corporation of Indiana
Filed Oct. 7, 1963, Ser. No. 314,352
8 Claims. (Cl. 198—64)

The present invention relates to a novel distribution system and more specifically to a novel apparatus for distributing poultry or livestock feed materials and the like from a storage bin or other source of supply to one or more discharge points.

While it will become apparent that the apparatus of the present invention may be adapted for distributing a wide variety of materials, the present disclosure will be facilitated by describing an embodiment of the apparatus which is especially suitable for distributing poultry or livestock feed materials from a source of supply to one or more points of discharge. Systems for distributing feed material have been proposed which include a relatively large storage bin or means for retaining a supply of the material and mechanisms for directing the material from the source of supply to the points of discharge. In many instances it is necessary to direct the feed material from the sources of supply first in one direction and then another in order to reach the desired point of discharge or, in other words, it is necessary to provide a bend or corner in the path of travel of the feed material. Certain heretofore proposed structures for accomplishing such feeding movement have required relatively complicated and expensive or inefficient drive and feeding mechanisms.

An important object of the present invention is to provide a novel distribution apparatus of the above-described type which is efficient in operation and may be relatively easily and economically manufactured and installed.

A more specific object of the present invention is to provide a novel distribution apparatus of the above-described type constructed in a simple and economical manner for effectively directing the material to be distributed along a path of travel having one or more curves or bends therein.

A still further specific object of the present invention is to provide a novel distributing apparatus of the above-described type which includes a plurality of helical screw auger members disposed at angles with respect to each other along the path of travel of the material to be distributed and supported and driven in a manner for promoting more efficient operation.

Other objects and advantages of the present invention will become apparent from the following description and the accompanying drawings wherein:

FIG. 1 is a fragmentary elevational view showing an apparatus incorporating features of the present invention;

FIG. 2 is an enlarged fragmentary partial sectional view showing a portion of the apparatus in greater detail;

FIG. 3 is further enlarged fragmentary partial sectional view showing a connection between screw or auger members of the apparatus in greater detail; and FIG. 4 is a sectional view taken along line 4—4 in FIG. 2.

Referring now more specifically to the drawings wherein like parts are designated by the same numerals throughout the various figures, an apparatus 10 incorporating features of the present invention is shown in FIG. 1. As previously indicated the apparatus may be utilized for distributing a wide variety of materials. For example, the apparatus 10 includes a relatively large tank, storage bin or other suitable means 12 for retaining a supply of poultry or livestock feed material which is to be distributed and dispensed. The apparatus may be modified and adapted for distributing the material to one or more points of discharge, and in the embodiment shown, it is contemplated that the apparatus 10 will deliver the material to separate hoppers 14 and 16 or other receiving means from which the material is to be subsequently dispensed.

In order to direct the feed or other material from the storage means 12 to the hoppers or receiving means 14 and 16, the apparatus is provided with a conveyor structure 18. It is apparent that the particular shape and arrangement of the conveyor means 18 may be modified in accordance with requirements of any given installation, but in any event the present invention contemplates the inclusion of one or more corners of bends 20 in the conveyor structure. In the embodiment shown for purposes of illustrating the present invention, the conveyor structure 18 comprises a first tube or conduit 22 formed in one or more pieces and having an end 24 connected with a fitting or boot 26 disposed at the lower end of the tank or storage means 12. The tubular conduit 22 is straight and substantially rigid and is disposed so that its central longitudinal axis is inclined upward from the horizontal, which axis is in alignment with an upwardly inclined trough portion 28 of the boot 26.

An upper end of the conduit 22 is connected with an elbow or corner fitting structure 30 that is also connected with a second tubular conduit 32 which, in the embodiment shown, extends generally horizontally over the hoppers 14 and 16 and is formed in one or more pieces. In any event it is to be noted that the conduit 32 is disposed so that its central longitudinal axis extends at an angle to the longitudinal axis of the conduit 22 and these axes intersect each other at a point 34 at the center of the elbow or corner fitting structure 30. The conduit 30 is provided with discharge openings 36 and 38 respectively above the hoppers 14 and 16 for permitting material to be dispensed to flow from the conduit into the hoppers.

As shown in FIGS. 2 and 4, the elbow structure 30 comprises complementary sections 40 and 42 which are secured together by a plurality of screws or bolts 44. The sections 40 and 42 combine together to provide tubular passageway portions 46 and 48 respectively axially aligned with and having diameters equal to the internal diameters of the conduit sections 22 and 32 so that the passageway portions 46 and 48, in effect, provide continuations of the passageways of the conduit sections 22 and 32. The passageway portions 46 and 48 intersect each other in a plane perpendicular to the axes thereof and containing the point 34.

As shown in FIG. 2, the passageway portions 46 and 48 are enlarged at 50 and 52 respectively. The end portions of the conduit sections 22 and 32 fit into the socket means provided by the enlargements 50 and 52 so that the interior surface of the passageway formed by the conduit means and the passageway portions 46 and 48 will be substantially smooth and continuous.

A helical screw auger 54 is provided for conveying material from the lower end of the trough 28 to the upper end of the conduit section 22. The auger 54 has first and second spiral flight portions 56 and 58 fixed on central shaft means 60. The shaft means 60 may be formed in one piece or, if desired, it may be formed in sections corresponding generally to the length of the flight portions 56 and 58. In the event the shaft means 60 is formed in a plurality of sections, adjacent ends of the sections are rigidly connected by suitable means.

The spiral flight portion 56 is formed with a first predetermined pitch and diameter, which diameter is substantially less than the internal diameter of the conduit 22. The flight portion 56 substantially completely traverses the trough 28 so that the flight portion 58 is outside of the boot and receives only material fed by the flight portion 56. The spiral flight portion 58 is formed with a pitch greater than the pitch of the flight portion 56 and a diameter greater than the diameter of the flight portion 56 but less than the internal diameter of the conduit 22. With this arrangement, the flight portion 58 is adapted to advance the material at a faster rate than the flight portion 56 so that material received from the flight portion 56 is spread out along the length of the conduit 22 for preventing overloading of the screw auger and jamming or packing of the material within the conduit 22.

The conveyor structure comprises a second helical screw auger 62 having a spiral flight 64 fixed on a central shaft 66. The pitch and spiral of the flight 64 are at least equal to the pitch and spiral of the flight portion 58 for promoting movement of the material being distributed along the conduit 32 without packing or jamming.

In accordance with features of the present invention the screw augers 54 and 62 are mounted and driven in a manner for minimizing contact thereof with inner surfaces of the tubular conduits and for promoting more efficient operation of the apparatus. More specifically, a lower end of the screw auger shaft 60 is rotatably supported by a bearing unit 68 in an end wall 70 of the trough 28, which bearing unit is positioned so that the lower end of the shaft 60 is substantially concentric with the conduit 22. A thrust collar 72 or other suitable means is fixed on the shaft 60 for cooperation with the bearing unit 68 for restraining the shaft 60 against axial movement. As indicated in FIG. 1, a downstream end portion of the screw auger shaft 66 is rotatably supported by a bearing unit 74 mounted at the downstream end of the conduit 32. This bearing unit is also constructed so as to restrain the shaft 66 against axial movement relative to the conduit 32 and is positioned so that the downstream end of the shaft 66 is concentric with the conduit 32.

As shown best in FIGS. 2 and 3, adjacent ends of the auger shafts 60 and 66 are interconnected by means of a universal joint 76. It is to be noted that the universal joint 76 is positioned so that the center thereof is located substantially at the previously mentioned point 34 which is the intersection between the longitudinal axes of the conduits 22 and 32 and also the axes of the augers. Thus the universal joint 76 not only connects the shafts 60 and 66 but also restrains the shafts so that they support each other in positions substantially concentric with their associated conduits 22 and 32. More specifically the auger shafts 60 and 66 support each other so that the flight portions 58 and 64 are located above the bottom surfaces of the conduits 22 and 32 as shown best in FIG. 2 for minimizing frictional contact between the screw augers and the conduit and thereby promoting more efficient operation of the apparatus. This arrangement also minimizes any tendency for the material being conveyed to be pinched and ground between the edges of the auger and the wall of the conduit whereby powdering of the material is minimized.

As shown best in FIG. 3, the universal joint 76 comprises first and second fork members 78 and 80 which are pivotally interconnected by a cross member 82. The fork members 78 and 80 respectively include socket portions 84 and 86 which receive end portions of the auger shafts 60 and 66. The construction is such that the socket portions 84 and 86 may be axially adjusted with respect to their associated shafts so that the effective length of the shafts may be adjusted in order to locate the center of the universal joint or, in other words, the center of the cross member 82 at the point 34. In the embodiment shown, the shafts 60 and 66 are formed with helically threaded end portions 88 and 90 for cooperating with complementary internal thread in the socket portions 84 and 86 in order to accomplish the aforementioned axial adjustment of the socket portions with respect to the shafts. The fork members are adapted to be locked in the desired adjusted positions with respect to the shaft by means of pins 92 and 94 removably insertable into apertures in the shafts and one of a plurality of apertures 96 and 98 provided through the socket portions.

The apparatus is provided with a motor 100 or other suitable prime mover for driving the screw auger. It is to be noted that the motor is located adjacent the downstream end of the conveyor structure and is adapted to drive a pulley or sprocket 102 fixed on a downstream end portion 104 of the auger shaft 66. A suitable endless chain or belt 106 is provided for driving the gear or sprocket 102 from a gear or sprocket 108 on an outlet shaft of the motor 100. Since the drive means is connected to the downstream end of the shaft 66, the augers are rotated in a manner such that they tend to pull the material through the conduits or, in other words, in a manner such that the load provided by the material places the augers under tension. Such tension loads minimize any tendency for the augers to bend or buckle and tend to cause the augers to center themselves within the conduits for further minimizing frictional contact between the augers and the walls of the conduit and thereby promoting more efficient operation.

The drive means provided by the motor and related elements is adapted to drive or rotate the auger 62 at a constant speed or angular velocity. At the same time, however, the universal joint connection between the auger 62 and the auger 54 causes the auger 54 to be rotated with a varying or pulsating angular velocity. The pulsations in the rotation of the auger 54 are imparted to the material being conveyed and this action aids in minimizing any tendency of the material to become jammed or packed or to fail to flow freely from the storage bin into the trough portion 28 of the boot whereby to insure a continued flow of the material from the storage bin.

While a preferred embodiment of the present invention has been shown and described herein, it is obvious that many structural details may be changed without departing from the spirit and scope of the appended claims.

The invention is claimed as follows:

1. A distribution system comprising storage means for containing a supply of material to be distributed, first closed tubular conduit means of predetermined internal diameter communicating with a lower portion of said storage means and extending upwardly therefrom along a predetermined axis, second closed tubular conduit means of predetermined internal diameter connected with an upper end of the first conduit means and extending laterally at an angle therefrom along a second predetermined axis, said axes substantially intersecting each other at a point, said first and second conduit means comprising first and second tubes respectively terminating short of each other at opposite sides of said point and defining a space therebetween, said conduit means comprising complementary members releasably secured together and around adjacent ends of said tubes and enclosing said space around said point, first helical screw auger means rotatably disposed in and substantially concentric with said first conduit means and having a maximum diameter less than said predetermined internal diameter of said first conduit means, second helical screw auger means rotatably disposed in and substantially concentric with said second conduit means and having a maximum diameter less than said predetermined diameter of said second conduit means, a single universal joint substantially at said point and connecting adjacent ends of said auger means and maintaining the said adjacent ends of said auger means out of contact with bottom surfaces of said conduit means and resisting movement of the auger means away from concentric disposition thereof within respective associated conduit means, and drive means connected with one of said auger means, said universal joint comprising yoke elements respectively connected to said adjacent ends of said auger means, at least one of said yoke elements being axially adjustable relative to its associated auger means, said complementary members being releasable for exposing said space and the universal joint and facilitating adjustment of said last mentioned yoke element.

2. An apparatus for distributing material comprising storage means for containing a supply of said material, first tubular conduit means of predetermined internal diameter communicating with said storage means and extending therefrom along a predetermined axis which projects in a direction having a horizontal component, second tubular conduit means of predetermined internal diameter connected with a downstream end of said first conduit means and extending at an angle therefrom along a second predetermined axis which projects in a second direction having a horizontal component, said axes substantially intersecting each other at a point, first self-supporting helical screw auger means of fixed axial length disposed in said first conduit means and having a predetermined maximum diameter less than said internal diameter of said first conduit means, second self-supporting helical screw auger means of fixed axial length disposed in said second conduit means and having a predetermined maximum diameter less than said internal diameter of said second conduit means, bearing means retaining said auger means against axial displacement and rotatably supporting ends of said auger means remote from said point substantially centrally with respect to their respective associated conduit means with said auger means above bottom internal surfaces of said conduit means, universal joint means substantially at said point and connecting and supporting adjacent ends of said auger means, said universal joint means being the only support for said adjacent ends and positioning said adjacent ends of said auger means substantially and cooperating with said bearing means to maintain the auger means centrally with respect to their associated conduit means and above internal bottom surfaces of said conduit means and resisting movement of the auger means away from central disposition thereof within respective associated conduit means.

3. A distributing apparatus as defined in claim 1 wherein said first auger means includes a first spiral flight portion at the lower end of said first conduit means and communicating with said storage means and a second spiral flight portion downstream of said first flight portion, said first flight portion having a predetermined pitch, and said second flight portion having a pitch greater than said predetermined pitch.

4. A distributing system, as defined in claim 3, wherein said first flight portion has a first diameter and said second flight portion has a diameter greater than the diameter of the first flight portion.

5. A distributing system, as defined in claim 1, wherein said universal joint comprises first and second fork members and a cross member interconnecting said fork members, and means respectively axially adjustably connecting said first and second fork members with said first and second auger means.

6. In a distribution system of the type described, the combination comprising a first conduit means of predetermined internal diameter and having an upstream end adapted to communicate with a source of material to be distributed and extending along a predetermined axis to a downstream end thereof, second conduit means having a predetermined internal diameter and communicating with said downstream end of said first conduit means and extending at an angle therefrom along a second predetermined axis, said axes intersecting each other substantially at a point, first and second self-supporting helical screw auger means of fixed axial length respectively disposed in and having diameters less than said internal diameters of said first and second conduit means, means restraining axial movement of said first auger means and rotatably supporting an upstream end of said first auger means generally centrally of said first conduit means and out of contact with internal side surfaces of said first conduit means, means restraining axial movement of said second auger means and rotatably supporting a downstream end of said second auger means generally centrally of said second conduit means and out of contact with internal side surfaces of said second conduit means, and a single universal joint disposed with its center substantially at said point and interconnecting and supporting adjacent ends of said first and second auger means, said universal joint providing the only support for said adjacent ends of the auger means and cooperating with said restraining means to maintain the said auger means out of contact with bottom surfaces of the conduit means and resisting movement of the auger means away from central disposition thereof within respective associated conduit means.

7. A distribution system, as defined in claim 6, wherein said first auger means includes a first spiral flight portion adjacent the upstream end of the first auger means and a second spiral flight portion downstream of said first flight portion, said first flight portion having a predetermined diameter and predetermined pitch, and said second flight portion having a diameter and pitch greater than the diameter and pitch of said first flight portion.

8. A distribution system, as defined in claim 6, wherein said universal joint comprises first and second fork members and a cross member pivotally connecting said fork members, and means axially adjustably connecting at least one of said fork members with its associated auger means.

References Cited by the Examiner
UNITED STATES PATENTS

| | | | |
|---|---|---|---|
| 940,069 | 11/1909 | Rowe | 64—17 |
| 2,073,059 | 3/1937 | Guthrie | 198—214 |
| 2,141,764 | 12/1938 | Riddell | 198—64 |
| 2,830,695 | 4/1958 | Fennimore | 198—213 |
| 3,016,128 | 1/1962 | Hacker | 198—213 |
| 3,074,534 | 1/1963 | Thiele | 198—66 |
| 3,100,052 | 8/1963 | Brembeck | 214—17.8 |

FOREIGN PATENTS 103,571  2/1924  Switzerland.

SAMUEL F. COLEMAN, *Primary Examiner.*

ERNEST A. FALLER, *Examiner.*

R. E. AEGERTER, *Assistant Examiner.*